(12) United States Patent
Nobu

(10) Patent No.: US 12,140,225 B2
(45) Date of Patent: Nov. 12, 2024

(54) VALVE ARRANGEMENT STRUCTURE OF CONTROL VALVE UNIT

(71) Applicants: JATCO Ltd, Fuji (JP); NISSAN MOTOR CO., LTD., Yokohama (JP)

(72) Inventor: Hisao Nobu, Hachioji (JP)

(73) Assignees: JATCO LTD, Fuji (JP); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 18/042,346

(22) PCT Filed: Sep. 21, 2021

(86) PCT No.: PCT/JP2021/034541
§ 371 (c)(1),
(2) Date: Feb. 21, 2023

(87) PCT Pub. No.: WO2022/091637
PCT Pub. Date: May 5, 2022

(65) Prior Publication Data
US 2023/0323946 A1    Oct. 12, 2023

(30) Foreign Application Priority Data
Nov. 2, 2020 (JP) ................................. 2020-183955

(51) Int. Cl.
*F16H 61/00* (2006.01)
*F16H 61/662* (2006.01)

(52) U.S. Cl.
CPC ..... *F16H 61/0031* (2013.01); *F16H 61/0009* (2013.01); *F16H 61/662* (2013.01)

(58) Field of Classification Search
CPC .. F16H 61/0031; F15B 11/17; F15B 13/0814; F15B 13/0842; F15B 13/0871
See application file for complete search history.

(56) References Cited

U.S. PATENT DOCUMENTS

| | | | |
|---|---|---|---|
| 9,528,600 B2* | 12/2016 | Moriyama | F16H 61/0021 |
| 9,746,072 B2* | 8/2017 | Sakai | F15B 15/14 |
| 9,903,468 B2* | 2/2018 | Hwang | F16H 61/0206 |
| 10,502,315 B2* | 12/2019 | Shin | F16H 61/143 |
| 10,816,092 B2* | 10/2020 | Harada | F16H 61/0206 |
| 10,865,812 B2* | 12/2020 | Hirai | F04C 15/0049 |

(Continued)

FOREIGN PATENT DOCUMENTS

| | | |
|---|---|---|
| JP | 2016-145635 A | 8/2016 |
| JP | 2017-161059 A | 9/2017 |

(Continued)

*Primary Examiner* — Michael Leslie
(74) *Attorney, Agent, or Firm* — Foley & Lardner LLP

(57) ABSTRACT

A valve arrangement structure of a control valve unit includes a control valve body to which oil is supplied from a main pump. The valve arrangement structure includes a pressure regulator valve that is arranged in the control valve body and regulates a pressure of discharged oil from the main pump to a line pressure, a pressure control valve that is arranged in the control valve body and regulates the pressure of the oil to a required pressure with the line pressure as a source pressure, and a first oil passage that is provided in the control valve body and connects the main pump and the pressure regulator valve. The pressure control valve is arranged on a second oil passage branched from the first oil passage.

3 Claims, 3 Drawing Sheets

(56) References Cited

U.S. PATENT DOCUMENTS

| | | | |
|---|---|---|---|
| 2013/0330216 A1* | 12/2013 | Yoshida | ............. F16H 61/0031 417/440 |
| 2017/0204970 A1 | 7/2017 | Honma et al. | |
| 2017/0259825 A1 | 9/2017 | Okada et al. | |
| 2021/0301915 A1 | 9/2021 | Yabuzaki | |
| 2023/0323945 A1* | 10/2023 | Nobu | ................... F15B 13/026 474/28 |

FOREIGN PATENT DOCUMENTS

| | | |
|---|---|---|
| WO | WO-2016/006356 A1 | 1/2016 |
| WO | WO-2020/022200 A1 | 1/2020 |

* cited by examiner

VALVE ARRANGEMENT STRUCTURE OF CONTROL VALVE UNIT

TECHNICAL FIELD

The present invention relates to a valve arrangement structure of a control valve unit.

BACKGROUND ART

FIG. 2 of Patent Document 1 discloses a hydraulic circuit diagram schematically showing an inside of a control valve unit of a continuously variable transmission. In Patent Document 1, as shown in FIGS. 1 and 2, a pump pressure discharged from an oil pump (3) driven by an engine (1) is discharged to an oil passage (401) and regulated to a line pressure by a pressure regulator valve (21). Then, the line pressure is introduced into a primary regulator valve (26), a secondary regulator valve (27), and a pilot valve (25) which use the line pressure as a source pressure.

PRIOR ART DOCUMENT

Patent Document

Patent Document 1: WO2016/006356 A1

SUMMARY OF INVENTION

Problems to be Solved by the Invention

In the hydraulic circuit diagram of FIG. 2 of Patent Document 1, the primary regulator valve (26), the secondary regulator valve (27), and the pilot valve (25) are arranged on an oil passage branched from an oil passage connecting the pump (3) and the pressure regulator valve (21).

However, the hydraulic circuit diagram of FIG. 2 of Patent Document 1 schematically shows the inside of the control valve unit, that is, schematically illustrates the hydraulic circuit in an easy-to-understand manner, and does not disclose an actual valve arrangement of a pressure control valve arranged in a control valve body.

In contrast, in a case where the actual valve arrangement of the pressure control valve arranged in the control valve body is described in Patent Document 1 as an example, all or a part of the primary regulator valve (26), the secondary regulator valve (27), and the pilot valve (25) are arranged on the oil passage connecting the pump (3) and the pressure regulator valve (21) due to space restrictions and the like.

However, the pressure regulator valve (21) regulates the pressure of the oil to a line pressure while draining a part of the oil supplied from the pump (3). This causes the oil to flow into the oil passage connecting the pump (3) and the pressure regulator valve (21).

Therefore, in this case, the pressure control valve arranged on the oil passage connecting the pump (3) and the pressure regulator valve (21) is affected by the oil flow, and a sliding resistance of a spool of the pressure control valve increases. The increase in the sliding resistance of the spool affects the movement of the spool, resulting in hydraulic oscillations, that is, repetitive up and down fluctuations of the hydraulic pressure in the pressure control valve, which may affect a hydraulic pressure response and a hydraulic pressure stability of the pressure control valve.

The present invention has been made in view of such problems, and has an object to improve the hydraulic pressure response and the hydraulic pressure stability of the pressure control valve which uses the line pressure as a source pressure.

A valve arrangement structure of a control valve unit according to a certain aspect of the present invention is a valve arrangement structure of a control valve unit which includes a control valve body to which oil is supplied from a main pump. The valve arrangement structure includes a pressure regulator valve that is arranged in the control valve body and regulates a pressure of discharged oil from the main pump to a line pressure, a pressure control valve that is arranged in the control valve body and regulates the pressure of the oil to a required pressure with the line pressure as a source pressure, and a first oil passage that is provided in the control valve body and connects the main pump and the pressure regulator valve. The pressure control valve is arranged on a second oil passage branched from the first oil passage.

According to the above-described aspect, since the pressure control valve is arranged outside the oil flow of the first oil passage, it is possible to improve the hydraulic pressure response and the hydraulic pressure stability of the pressure control valve which uses the line pressure as the source pressure.

DESCRIPTION OF EMBODIMENTS

The following will describe the embodiments of the present invention with reference to the accompanying drawings.

Figure 1:
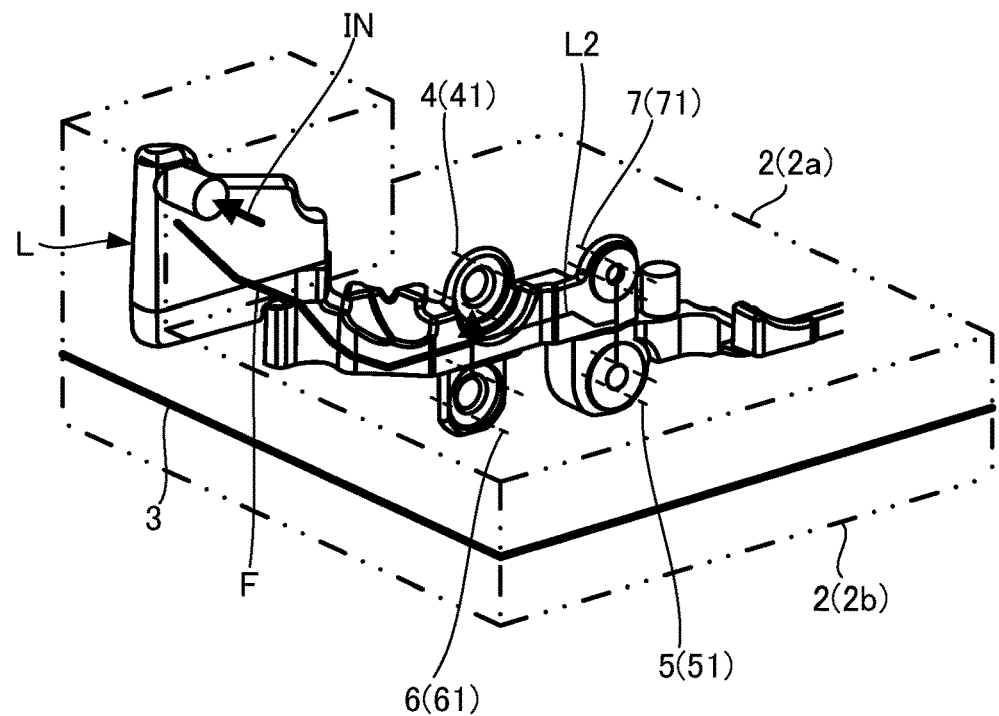
FIG. 1 is a diagram showing an example of an actual state of a line pressure oil passage.
Figure 2:
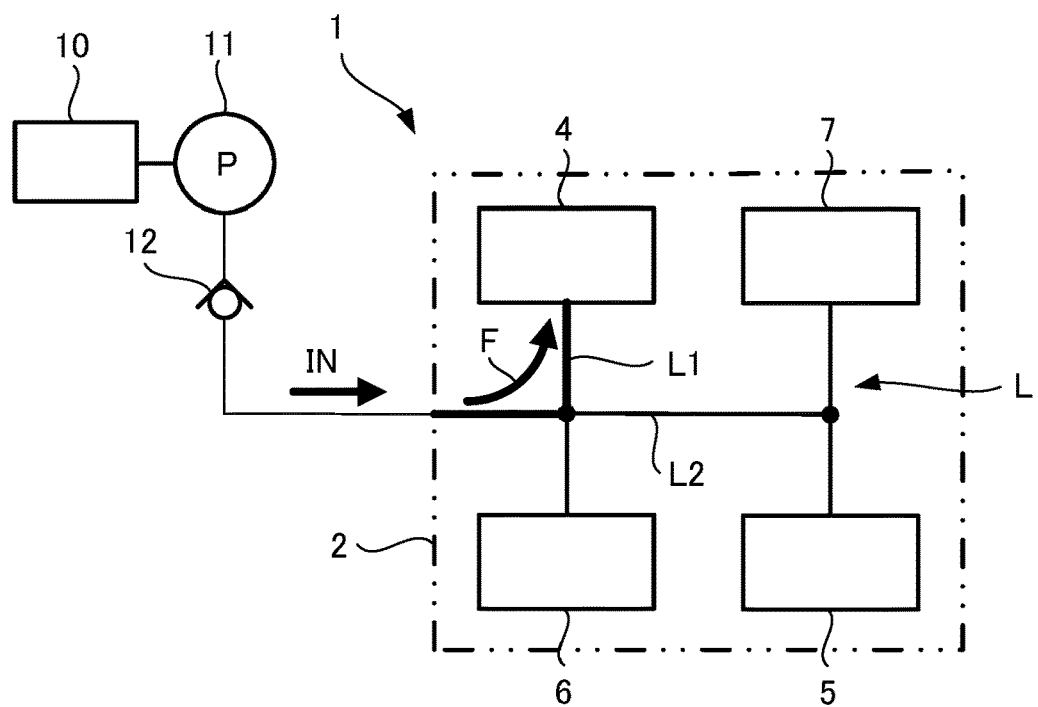
FIG. 2 is a schematic configuration diagram of a valve arrangement structure of a control valve unit.
Figure 3:
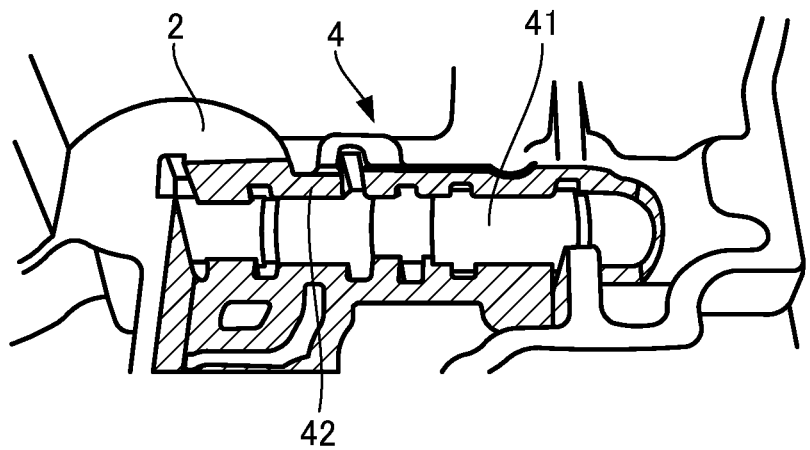
FIG. 3 is a view showing a spool in a partially cut model of a control valve body.

FIG. 1 is a diagram showing an example of an actual state of a line pressure oil passage L. FIG. 2 is a schematic configuration diagram of a valve arrangement structure of a control valve unit 1. FIG. 3 is a view showing a spool 41 of a pressure regulator valve 4 in a partially cut model of a control valve body 2. FIG. 1 schematically shows the control valve body 2, in which the line pressure oil passage L is formed, with dashed double-dotted lines, and also schematically shows each spool, such as the spool 41, with dashed lines. FIG. 2 shows the valve arrangement structure of the control valve unit 1 in a valve arrangement in accordance with the actual state of the line pressure oil passage L shown in FIG. 1.

The control valve unit 1 is used in a transmission. The transmission is, for example, a belt continuously variable transmission. The control valve unit 1 includes the control valve body 2, a separator plate 3, the pressure regulator valve 4, a primary pulley pressure control valve 5, a secondary pulley pressure control valve 6, and a pilot valve 7.

The control valve body 2 has a first body 2a and a second body 2b, and the separator plate 3 is provided between the first body 2a and the second body 2b. It may be understood that the control valve body 2 further includes the separator plate 3. In the control valve body 2, the first body 2a and the second body 2b form a plurality of stacked partial bodies and are adjacent to each other in the stacking direction.

The separator plate 3 functions as a partition between the first body 2a and the second body 2b. The line pressure oil passage L is constituted by oil grooves formed respectively on faces of the first body 2a and the second body 2b facing each other, and oil holes provided on the separator plate 3 and communicating respectively the oil grooves of the first body 2a and the second body 2b.

Oil is supplied to the control valve body 2 from a mechanical oil pump 11 via a check valve 12 as shown by an arrow IN. The mechanical oil pump 11 is a pump driven by an engine 10, and corresponds to a main pump. The control valve body 2 may be configured to be supplied with the oil, for example, with an electric oil pump as the main pump. In the present embodiment, where there is not a plurality of pumps supplying the oil to the control valve body 2 but one mechanical oil pump 11, in this case, that one pump can be understood as the main pump. The check valve 12 allows the oil to flow in a direction from the mechanical oil pump 11 toward the control valve body 2, and prevents the oil from flowing in an opposite direction.

The control valve body 2 is provided with the pressure regulator valve 4, the primary pulley pressure control valve 5, the secondary pulley pressure control valve 6, and the pilot valve 7. In this example, the pressure regulator valve 4 and the pilot valve 7 are provided on the first body 2a, and the primary pulley pressure control valve 5 and the secondary pulley pressure control valve 6 are provided on the second body 2b.

The pressure regulator valve 4 regulates the pressure of the discharged oil from the mechanical oil pump 11 to a line pressure. The pressure regulator valve 4 regulates the pressure of the oil to the line pressure while draining a part of the oil supplied from the mechanical oil pump 11. Therefore, in a first oil passage L1 connecting the mechanical oil pump 11 and the pressure regulator valve 4 in the control valve body 2, the oil flow as indicated by an arrow F occurs.

The first oil passage L1 is a part of the line pressure oil passage L provided in the control valve body 2, and the line pressure oil passage L includes, in addition to the first oil passage L1, a second oil passage L2 branched from the first oil passage L1. In FIG. 2, among the line pressure oil passage L, a thick line portion indicates the first oil passage L1 and a thin line portion indicates the second oil passage L2. The second oil passage L2 branched from the first oil passage L1 includes a plurality of oil passages branched from the first oil passage L1, and also includes oil passages further branched after branched from the first oil passage L1.

Each of the primary pulley pressure control valve 5, the secondary pulley pressure control valve 6, and the pilot valve 7 forms a pressure control valve that regulates the pressure of the oil to a required pressure with the line pressure as a source pressure. The oil is supplied from the primary pulley pressure control valve 5 to a primary pulley of the belt continuously variable transmission and from the secondary pulley pressure control valve 6 to a secondary pulley of the belt continuously variable transmission. The oil is supplied from the pilot valve 7, for example, to each of linear solenoid valves that generate signal pressures for the pressure regulator valve 4, the primary pulley pressure control valve 5, and the secondary pulley pressure control valve 6.

The linear solenoid valves generate the signal pressures which are in accordance with the required pressure under a control of a controller, and the pressure regulator valve 4, the primary pulley pressure control valve 5, and the secondary pulley pressure control valve 6 each regulate the pressure of the oil to the required pressure according to the signal pressures generated by each of the corresponding linear solenoid valves. Each of the primary pulley pressure control valve 5, the secondary pulley pressure control valve 6, and the pilot valve 7 is a pressure reducing valve, and the pilot valve 7 operates such that the oil has a predetermined required pressure. The primary pulley pressure control valve 5 and the secondary pulley pressure control valve 6 form a pulley pressure control valve of the belt continuously variable transmission.

The pressure regulator valve 4 includes the spool 41 indicated by the dashed lines in FIG. 1. Similarly, the primary pulley pressure control valve 5 includes the spool 51, the secondary pulley pressure control valve 6 includes the spool 61, and the pilot valve 7 includes the spool 71.

As shown in FIG. 3, the spool 41 is arranged in the control valve body 2. The pressure regulator valve 4 is configured to include the spool 41 arranged as described above and a sleeve 42 which is formed by a part of the control valve body 2 and on which the spool 41 slides. The pressure regulator valve 4 configured as described above is configured to be arranged in the control valve body 2. The primary pulley pressure control valve 5, the secondary pulley pressure control valve 6, and the pilot valve 7 are configured in the same manner as the pressure regulator valve 4.

As shown in FIG. 1, the spool 41, the spool 51, the spool 61, and the spool 71 are interposed into the line pressure oil passage L. A ring-shaped oil passage formed around the spool 41 corresponds to an oil inlet port formed on the sleeve 42. The same applies to the spool 51, the spool 61, and the spool 71.

As can be understood from FIG. 1, which shows the actual state of the line pressure oil passage L, and FIG. 2, which is drawn in accordance with the actual state of the line pressure oil passage L, the primary pulley pressure control valve 5, the secondary pulley pressure control valve 6, and the pilot valve 7 are arranged on the second oil passage L2, respectively.

That is, these pressure control valves are arranged in a so-called branch arrangement, in which the first oil passage L1 is the main oil passage and the second oil passage L2 is the branch oil passage. These pressure control valves are therefore arranged outside the oil flow indicated by the arrow F. It should be noted that the second oil passage L2 indicated by a reference numeral in FIG. 1 is a schematic diagram of the second oil passage L2 drawn in the actual state such that it can be seen how the oil passage branches in the line pressure oil passage L drawn in the actual state.

Next, major actions and effects of the present embodiment will be described.

Figure 4:
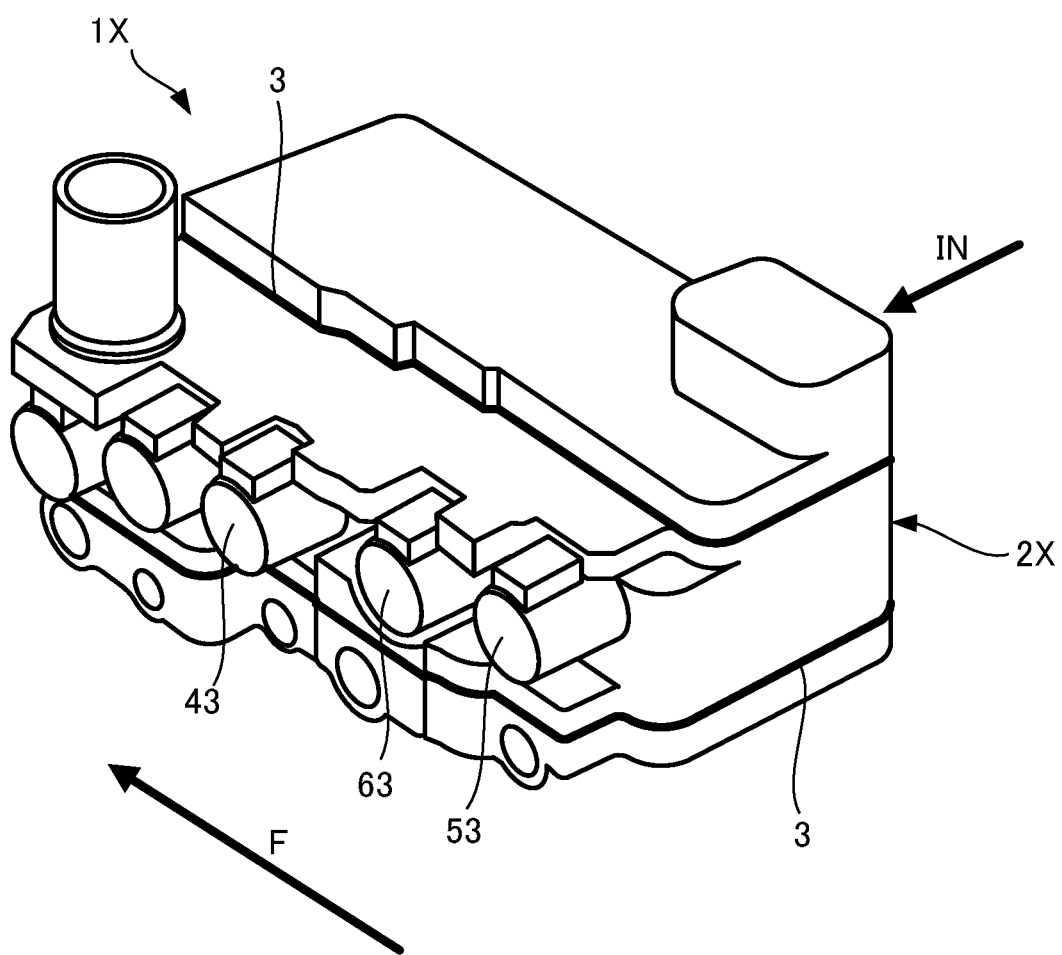
FIG. 4 is an external view of a comparative example of a control valve.

FIG. 4 is an external view of the control valve unit 1X which is a comparative example. The control valve unit 1X includes the control valve body 2X. The control valve body 2X is configured according to a valve arrangement different from the present embodiment, and in this example, it is configured to includes three partial bodies. For this reason, in this example, the separator plate 3 is provided between each of the two adjacent partial bodies in the stacking direction among the three partial bodies.

It is shown that a solenoid valve 43 is a linear solenoid valve that supplies the signal pressure to the pressure regulator valve 4. Similarly, the solenoid valve 53 is the linear solenoid valve that supplies the signal pressure to the primary pulley pressure control valve 5, and the solenoid valve 63 is the linear solenoid valve that supplies the signal pressure to the secondary pulley pressure control valve 6.

In this example, the solenoid valve 43, the solenoid valve 53, and the solenoid valve 63 are each arranged in accordance with the corresponding pressure control valve arrangement in the control valve body 2X. In other words, in this example, the valve arrangement is such that the primary pulley pressure control valve 5, the secondary pulley pressure control valve 6, and the pressure regulator valve 4 are provided in order from upstream side along the arrow F indicating the oil flow in the first oil passage L1.

Therefore, in this example, the spool 51 of the primary pulley pressure control valve 5 and the spool 61 of the secondary pulley pressure control valve 6 are affected by the oil flow indicated by the arrow F. As a result, the sliding resistance of the spool 51 and the spool 61 increases, resulting in hydraulic oscillations in these pressure control valves, which may cause a situation in which a hydraulic pressure response and a hydraulic pressure stability of these pressure control valves are affected.

As shown in FIGS. 1 and 2, the valve arrangement structure of the control valve unit 1 according to the present embodiment includes the control valve body 2 to which the oil is supplied from the mechanical oil pump 11. The present valve arrangement structure includes the pressure regulator valve 4 that is arranged in the control valve body 2 and regulates the discharged oil from the mechanical oil pump 11 to the line pressure, the primary pulley pressure control valve 5, the secondary pulley pressure control valve 6 and the pilot valve 7 that are arranged in the control valve body 2 and regulate the pressure of the oil to the required pressure with the line pressure as the source pressure, and the first oil passage L1 that is provided in the control valve body 2 and connects the mechanical oil pump 11 and the pressure regulator valve 4. In the present valve arrangement structure, the primary pulley pressure control valve 5, the secondary pulley pressure control valve 6, and the pilot valve 7 are arranged in the second oil passage L2 branched from the first oil passage L1.

(1) According to such a configuration, the primary pulley pressure control valve 5, the secondary pulley pressure control valve 6, and the pilot valve 7 are arranged outside the oil flow in the first oil passage L1 indicated by the arrow F. As a result, it is possible to improve the hydraulic pressure response and the hydraulic pressure stability of the primary pulley pressure control valve 5, the secondary pulley pressure control valve 6, and the pilot valve 7 which use the line pressure as the source pressure.

The valve arrangement structure of the control valve unit 1 may be configured as follows.

Figure 5:
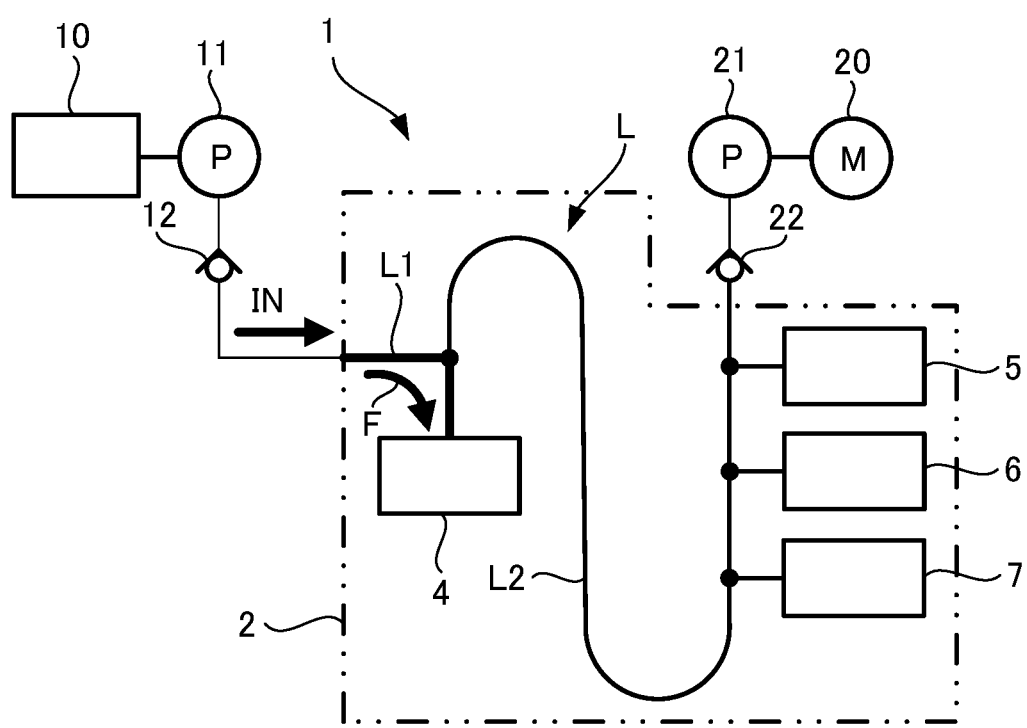
FIG. 5 is a view showing a modification of the valve arrangement structure of the control valve unit.

FIG. 5 is a view showing a modification of the valve arrangement structure of the control valve unit 1. In FIG. 5, the valve arrangement of the pressure regulator valve 4, the primary pulley pressure control valve 5, the secondary pulley pressure control valve 6, and the pilot valve 7 is shown according to the actual state.

In this example, the control valve body 2 is additionally supplied with the oil from the electric oil pump 21 driven by an electric motor 20, in addition to the mechanical oil pump 11. The electric oil pump 21 supplies the oil to the control valve body 2 via the check valve 22. The check valve 22 allows the oil to flow in a direction from the electric oil pump 21 toward the control valve body 2, and prevents the oil from flowing in the opposite direction.

The electric oil pump 21 connects to each of the pressure control valves, which are the primary pulley pressure control valve 5, the secondary pulley pressure control valve 6 and the pilot valve 7, via the second oil passage L2 instead of via the first oil passage L1. That is, the electric oil pump 21 is arranged in the so-called branch arrangement. The electric oil pump 21 is used as an auxiliary oil pump for the mechanical oil pump 11, and corresponds to an assist pump.

(2) According to such a configuration, the electric oil pump 21 can supply the oil more quickly to the pressure control valve that requires the oil than a case where the electric oil pump 21 is arranged in parallel with the mechanical oil pump 11 and the oil is supplied to the pressure control valve via the first oil passage L1. Therefore, it is possible to further improve the hydraulic pressure response and the hydraulic pressure stability of the pressure control valves including the primary pulley pressure control valve 5 which use the line pressure as the source pressure. Further, in this case, by arranging the electric oil pump 21 in the branch arrangement, the pressure control valves including the primary pulley pressure control valve 5 can be arranged away from the pressure regulator valve 4. This eases space constraints on the arrangement of the pressure control valves and improves the layout of the valve arrangement.

The electric oil pump 21 is arranged close to the primary pulley pressure control valve 5, which is an example of the pulley pressure control valves. In other words, the primary pulley pressure control valve 5 is the pressure control valve arranged closest to the electric oil pump 21 on the second oil passage L2.

(3) According to such a configuration, the oil can be quickly supplied from the electric oil pump 21 to an actuator of the primary pulley, which is an example of a pulley to which oil supply is important, in the belt continuously variable transmission, and this configuration is also preferable from the viewpoint of pressure loss of the oil supplied from the electric oil pump 21.

Although the embodiments of the present invention have been described above, the above-mentioned embodiments are merely illustrations of parts of application examples of the present invention, and there is no intention to limit the technical scope of the present invention to the specific configuration of the above-mentioned embodiments.

The present application claims a priority based on Japanese Patent Application No. 2020-183955 filed with the Japan Patent Office on Nov. 2, 2020, all the contents of which are hereby incorporated by reference.

DESCRIPTION OF REFERENCE SIGNS

1 Control valve unit
1X Control valve unit
2 Control valve body
2X Control valve body
4 Pressure regulator valve
41 Spool
5 Primary pulley pressure control valve (pressure control valve, pulley pressure control valve)
51 Spool
6 Secondary pulley pressure control valve (pressure control valve, pulley pressure control valve)
61 Spool
7 Pilot valve (pressure control valve)
71 Spool
11 Mechanical oil pump
21 Electric oil pump
L1 First oil passage
L2 Second oil passage

The invention claimed is:

1. A valve arrangement structure of a control valve unit including a control valve body to which oil is supplied from a main pump, the valve arrangement structure comprising:

a pressure regulator valve that is arranged in the control valve body and regulates a pressure of discharged oil from the main pump to a line pressure;

a plurality of pressure control valves that are arranged in the control valve body and regulate the pressure of the oil to a required pressure with the line pressure as a source pressure; and a first oil passage that is provided in the control valve body and connects the main pump and the pressure regulator valve, wherein a plurality of the pressure control valves are arranged on a second oil passage branched from the first oil passage, the control valve body is also supplied with oil from an assist pump driven by a driving source different from a driving source of the main pump, the second oil passage includes a first branched point branched from the first oil passage and a second branched point branched to the plurality of the pressure control valves, and the assist pump connects to the plurality of the pressure control valves via the second oil passage instead of via the first oil passage, and is arranged in a branch arrangement with the first oil passage as a main oil passage and the second oil passage as a branch oil passage, and is arranged on a section between one of the plurality of the pressure control valves and the second branched point.

2. The valve arrangement structure of the control valve unit according to claim 1, wherein the plurality of the pressure control valves include a pulley pressure control valve of a belt continuously variable transmission and another pressure control valve different from the pulley pressure control valve, and the assist pump is arranged closer to the pulley pressure control valve than said another pressure control valve.

3. The valve arrangement structure of the control valve unit according to claim 2, wherein the plurality of pulley pressure control valves includes a primary pulley pressure control valve and a secondary pulley pressure control valve, and the primary pulley pressure control valve is the pressure control valve that is arranged closest to the assist pump on the second oil passage among the plurality of the pressure control valves.

\* \* \* \* \*